United States Patent [19]

Strong et al.

[11] 4,034,066
[45] July 5, 1977

[54] METHOD AND HIGH PRESSURE REACTION VESSEL FOR QUALITY CONTROL OF DIAMOND GROWTH ON DIAMOND SEED

[75] Inventors: Herbert M. Strong, Schenectady; Roy E. Tuft, Guilderland Center, both of N.Y.

[73] Assignee: General Electric Company, Columbus, Ohio

[22] Filed: Nov. 2, 1973

[21] Appl. No.: 412,425

[52] U.S. Cl. .............................. 423/446; 63/32; 106/42; 206/524.4; 23/289
[51] Int. Cl.² ....................................... C01B 31/06
[58] Field of Search ...... 423/446; 23/252 R, 273 R, 23/289, 273 SP; 425/77; 206/84, 209; 106/42; 63/32

[56] References Cited

UNITED STATES PATENTS

| | | | |
|---|---|---|---|
| 3,297,407 | 1/1967 | Wentorf | 423/446 |
| 3,303,053 | 2/1967 | Strong et al. | 423/446 |
| 3,317,035 | 5/1967 | Cannon | 423/446 X |
| 3,346,102 | 10/1967 | Strong | 423/446 X |
| 3,423,177 | 1/1969 | Bovenkerk | 423/446 |

OTHER PUBLICATIONS

Armagnac, "Popular Science" vol. 197, No. 3, 1970, pp. 82, 83, 134 and 137.

*Primary Examiner*—Edward J. Meros
*Attorney, Agent, or Firm*—Donald J. Voss; Edward A. Hedman

[57] ABSTRACT

Improvements are provided in reaction vessel construction used in the growth of diamond by the process disclosed in U.S. Pat. No. 3,297,407 — Wentorf, Jr. In assembly of the reaction vessel of this invention, the plug of catalyst-solvent material is disposed between the source of carbon and the diamond seed material as in the Wentorf, Jr. patent and, in addition, the diamond seed material is separated from the catalyst-solvent plug by means for isolating the diamond seed material from the catalyst-solvent material until after the latter has become saturated with carbon from the source of carbon. In addition, preferably the under surface of the plug of catalyst-solvent metal is covered with means for suppressing diamond nucleation. The nucleation suppressing means is usually in the form of a disc and may completely cover the underside of the catalyst-solvent plug or may have a hole therethrough in juxtaposition to the diamond seed/isolating means combination(s). When both the isolating means and the nucleation suppressing means are employed, capability is provided for simultaneously preventing dissolution of the diamond seed and suppressing spurious diamond nucleation.

23 Claims, 9 Drawing Figures

4,034,066

METHOD AND HIGH PRESSURE REACTION VESSEL FOR QUALITY CONTROL OF DIAMOND GROWTH ON DIAMOND SEED

BACKGROUND OF THE INVENTION

The synthesis of diamond crystals by high pressure, high temperature processes has become well established commerically. Preferred methods for making diamonds are disclosed and claimed in U.S. Pat. Nos. 2,947,610 — Hall et al. and 2,947,609 — Strong. Apparatus for the conduct of such processes is described and claimed in U.S. Pat. No. 2,941,248 — Hall. The Hall et al., Strong and Hall patents are incorporated by reference.

Diamond growth in the aforementioned processes occurs by the diffusion of carbon through a thin metallic film of any of a series of specific catalyst-solvent materials. Although such processes are very successfully employed for the commercial production of industrial diamond, the ultimate crystal size of such diamond growth is limited by the fact that the carbon flux across the catalyst film is established by the solubility difference between graphite (the typical starting material) and the diamond being formed. This solubility difference is generally susceptible to significant decrease over any extended period due to a decrease in pressure in the system and/or poisoning effects in the graphite being converted.

On the other hand, in the method of growing diamond on a diamond seed crystal disclosed in U.S. Pat. No. 3,297,407 — Wentorf, Jr. (incorporated by reference) a difference in temperature between the diamond seed and the source of carbon is relied upon to establish a concentration gradient in carbon for deposition on the seed. Catalyst-solvents disclosed in the aforementioned Hall et al and Strong patents are used in the temperature gradient method as well. The growth of diamond on the seed material is driven by the difference in solubility of diamond in the molten catalyst-solvent metal at the nutrient (source of carbon) and at the seed, between which locations a temperature gradient exists. Most important, this general type of reaction vessel configuration presents a pressure stable system so that pressure can more readily be kept in the diamond stable region.

By very carefully adjusting pressure and temperature and utilizing relatively small temperature gradients with extended (relative to growth times for thin film method) growth times, larger diamonds can be produced by the method as taught in the Wentorf patent than by the thin-film method.

Attempts to reliably produce very high quality diamond growth, however, have presented at least two apparently mutually exclusive, yet simultaneously occurring problems. These problems are:

a. the strong tendency for spontaneous nucleation of diamond crystals near the diamond seed material (which occurs with increase in the temperature gradient over the "safe" value); if the growth period is extended to produce from the seed diamond growth of greater than about 1/20 carat in size the nucleated growth competes with the growth proceeding from the diamond seed with subsequently occurring collisions of multiple crystals that result in stress fractures therein, and b. either partial or complete dissolution of the diamond seed material in the melted catalyst-solvent metal during that part of the process in which the catalyst-solvent medium becomes saturated with carbon from the nutrient source and then melts; such dissolution produces uncoordinated diamond growth proceeding from spaced loci, which growths upon meeting, result in subsequent confused, flaw-filled growth.

SUMMARY OF THE INVENTION

The instant invention provides an improvement over the invention disclosed in Wentorf, Jr. making possible the simultaneous solution of each of problems (a) and (b) set forth above and enabling the production of large diamond crystals having purities and freedom from flaws extending to the degree of perfection recognized as characteristic of gem quality. Thus, examples are given herein of diamonds produced in accordance to the teachings of this invention that are without internal flaws when viewed under a corrected magnifier of not less than 10 power. Some of these same diamonds have been graded as having a rating in the H–J range in the GIA Color-Grading System [page 308 of The Diamond Dictionary, Copyright 1960, Gemological Institute of America].

In the reaction vessel construction of the instant invention, as assembled, the body of catalyst-solvent metal is separated from the diamond seed material by means for isolating the diamond seed material from the catlayst-solvent material until after the latter has become saturated with carbon from the source of carbon. Preferably, this isolating means is a barrier layer of a metal selected from a list of specific metals set forth hereinbelow.

In addition to the aforementioned isolating means, means for suppressing diamond nucleation may be disposed as a layer, or disc, in contact with and covering the underside of the mass of catalyst-solvent metal. The layer of diamond nucleation suppressing means is preferably made of a material selected from a specific list of materials also set forth hereinbelow.

When both a barrier layer and a nucleation suppression layer are used in any given reaction vessel construction, the materials of which these layers are made differ from each other and from the catalyst-solvent mass employed. In any event the metal selected for the barrier layer must have a melting point, when it is in contact with diamond, that is higher than the melting point of the metallic catalyst-solvent, when the catalyst-solvent is both (a) saturated with carbon dissolved therein and (b) in contact with diamond.

BRIEF DESCRIPTION OF THE DRAWING

This invention will be better understood from the following description and drawing in which.

DESCRIPTION OF THE PREFERRED EMBODIMENT

One preferred form of a high pressure, high temperature apparatus in which the reaction vessel of the instant invention may be employed is the subject of the afprementioned U.S. Pat. No. 2,941,248 — Hall and is schematically illustrated in FIG. 1.

Figure 1:
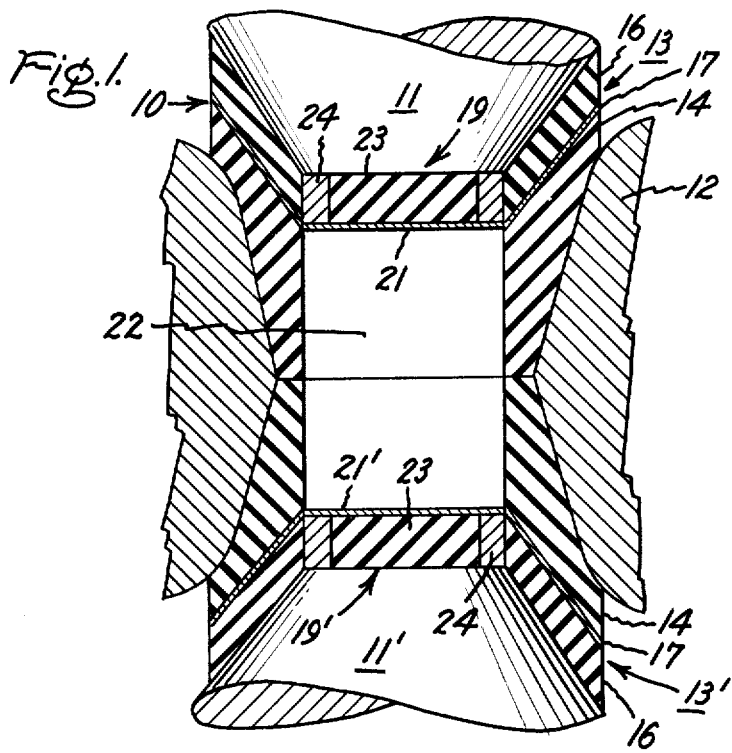
FIG. 1 illustrates one exemplary high pressure, high temperature apparatus useful in the practice of this invention.

In FIG. 1, apparatus 10 includes a pair of cemented tungsten carbide punches 11 and 11' and an intermediate belt or die member 12 of the same material. Die member 12 defines a centrally-located aperture and in combination with punches 11, 11' defines a pair of annular volumes. Between punch 11 and the die 12 and between punch 11' and the die 12 there are included gasket/insulating assemblies 13, 13', each comprising a pair of thermally insulating and electrically non-conducting pyrophyllite members 14 and 16 and an intermediate metallic gasket 17. The aforementioned assemblies 13, 13' together with end cap assemblies 19, 19' and electrically conductive metal end discs 21, 21' serve to define the volume 22 occupied by reaction vessel 30. Each end cap assembly comprises a pyrophyllite plug, or disc, 23 surrounded by an electrically conducting ring 24.

Reaction vessel 30 (FIG. 2) is of the general type disclosed in U.S. Pat. No. 3,030,662 — Strong (incorporated by reference) modified by the addition of steel retaining rings 31 and 32. Hollow cylinder 33 is preferably made of pure sodium chloride, but may be made of other material such as talc.

Broad criteria for the selection of the material for cylinder 33 are that the material (a) not be converted under pressure to a stronger and stiffer state as by phase transformation and/or compaction and (b) be substantially free of volume discontinuities appearing under the application of high temperatures and pressures as occurs, for example, with pyrophyllite and porous alumina. The materials meeting the criteria set forth in U.S. Pat. No. 3,030,662 (column 1, line 59 through column 2, line 2) are useful for preparing cylinder 33. Positioned concentrically within and adjacent cylinder 33 is a graphite electrical resistance heater tube 34. Within graphite heater tube 34 there is in turn concentrically positioned cylindrical salt liner plug 36 upon which are positioned hollow salt cylinder 37 and its contents.

Operational techniques for applying both high pressures and high temperatures in this apparatus are well known to those skilled in the art. The foregoing description relates to merely one high pressure, high temperature apparatus. Various other apparatuses are capable of providing the required pressures and temperatures that may be employed within the scope of this invention. Pressures, temperatures, metallic catalyst-solvents and calibrating techniques are disclosed in the aformentioned patents incorporated by reference.

The bottom end of cylinder 37 encloses the embedment disc 38 having at least one diamond seed 39 embedded therein. If a plurality of diamond seeds they would be located in spaced locations with one at each location. Diamond seeds are preferably ¼ to ½ mm in size and having a cube face, but diamond may be seeded from any face. Preferably, all of the underside of plug 41 of metallic catalyst-solvent is covered with means for suppressing diamond nucleation over a preselected area (e.g. disc, or layer, 42) except, perhaps, for a hole therethrough as shown in FIGS. 4-8. Isolating means are always initially disposed between diamond seed 39 and the direction by which molten catalyst-solvent will move to reach seed 39 in order to prevent premature contact therebetween such as would result in dissolution (partial or complete) of seed 39. The upper surface of diamond seed material 39 should be oriented with a well-formed face e.g. a cube face in contact with the underside of metal disc 43. Also located within salt cylinder 37 are the nutrient supply 44 and salt cylinder 46 disposed thereover.

Pressure-transmitting members 36, 37, 38 and 46 are made of material meeting the same criteria as the material for cylinder 33. All of parts 33, 36, 37, 38 and 46 are dried in vacuum for 24 hours at 124° C. before assembly. Other combinations of shapes for the pressure-transmitting members 36, 37, 38 and 46, may, of course, be employed. However, the arrangement of these parts shown in FIG. 2 has been found to be the most convenient to prepare and assemble.

When reaction vessel 30 is disposed in space 22, heater tube 34 forms electrical contact between end discs 21, 21' so that heat may be controllably applied during conduct of the process.

Seed isolation disc (barrier layer) 43 is preferably made of platinum but may be made of a metal selected from any of the metals in the group consisting of platinum, molybdenum, titanium, tantalum, tungsten, iridium, osmium, rhodium, palladium, vanadium, ruthenium, chromium, hafnium, rhenium, niobium and zirconium and alloys of these metals. By preventing damage to the exposed seed face the isolation or barrier metal prevents the occurrence of diamond growth from more than one locus on the seed face. To insure requisite isolation, disc 43 is unpierced, at least where it is in contact with the diamond seed material. When such protection is not provided, erosion of the diamond seed material occurs. Considering a given diamond seed the erosion may either completely or partially destroy the seed. In the former case diamond nucleation can occur at spaced loci at the underside of the catalyst-solvent mass and in the latter case diamond growth usually proceeds from different loci on the eroded seed. Resultant new diamond growth in either case is lacking in coordination between the multiple growths and many flaws develop at the interface(s) when these separate growths meet.

In any given reaction vessel construction different materials are employed for each of (a) the catalyst-solvent material, (b) the barrier layer and (c) the nucleation suppressing layer. Nucleation suppressing layer 42 is selected from the group consisting of cobalt, iron manganese, titanium, chromium, tungsten, vanadium, niobium, tantalum, zirconium, alloys of the preceding metals, mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family. Preferably, in the last instance silicon carbide particles are mixed with an inert material such as sodium chloride and formed as a solid disc having the upper surface thereof (in contact with the underside of plug 41) covered with a thin layer of one of the platinum family metals.

When disc 42 is made of mica, polycrystalline high-density alumina, quartz, silica glass or other material presenting a layer with which the molten catalyst-solvent system will not alloy and/or cannot penetrate, it is necessary to provide a hole (as shown in FIGS. 4–8) through disc 42 to accommodate contact between the molten catalyst-solvent bath and disc 43 for eventual contact with seed 39. Disc 42 may, of course, be provided with a hole when made of metal, if desired.

The nutrient material 44 may be composed of diamond, diamond plus graphite or may be entirely of graphite, if desired. In the case of diamond plus graphite, the graphite occupies any void space. It is preferred that the nutrient contain mostly diamond in order to reduce the volume shrinkage that can result during conduct of the process. In conduct of the process any graphite present at operating temperatures and pressures converts to diamond before going into solution in the catalyst-solvent metal. Thus, the pressure loss is minimized so that the overall pressure remains in the diamond-stable region at the operating temperature.

When a nucleation suppressing layer 42 is employed, enough of the surface of the underside of catalyst-solvent metal plug 41 is covered by the layer 42 to provide an environment adjacent the seed 39 in which spontaneous diamond nucleation will be suppressed for a considerable distance around diamond seed 39. Thus, the entire underside of plug 41 may be covered by layer 42, but if less than the entire surface is covered, the layer 42 should extend at least 50% more distance from the seed than the lateral growth dimension desired. If the disc 42 is made of one of the metallic materials listed above, some space must exist between the diamond seed 39 and the closet portion of disc 42 into which the material of disc 38 will extend. When layer 42 is a metal and is provided with a hole, the ratio of diameter of hole to largest dimension of seed 39 should be in the range of 1.5:1 to 5:1. When layer 42 is composed of mica, the hole is preferably much smaller than the seed, e.g. as small as 0.001 to 0.020 inch. This has effect of making the seed presented to the catalyst-solvent bath very small, leading to greater perfection of seeding and growth.

The exact mechanism (or mechanisms) by which discs, or layers, of the diamond nucleation suppressor materials function to reduce or eliminate diamond nucleation is not known for certain.

In the case of the isolation means for the diamond seed material (disc 43) physical contact between the catalyst-solvent metal and the diamond seed is prevented until after the catalyst-solvent metal 41 has melted and become saturated with carbon from the nutrient mass 44. The timing is such that this carbon saturation occurs before barrier layer 43 is dissolved by the molten catalyst-solvent. Once barrier layer 43 becomes dissolved in the molten catalyst solvent the exposed face of the diamond seed 39 sets the pattern of growth and development of the new growth may proceed.

The thickness of the nucleation suppressing layer 42, when used, should range from about 1 to about 10 mils while the thickness of the seed isolation disc 43 should range from about one-half to about 10 mils. When natural mica, e.g. muscovite is employed, the disc should first be fired at about 800° C. for 12–15 hours. The preferred thickness of mica is about 2–3 mils.

Even those isolation disc materials listed which form carbides that are stable with respect to diamond at the pressures and temperatures employed function well since the carbide forming process is slow compared to the speed with which the pool of catalyst-solvent metal becomes saturated with carbon. Any carbide formed eventually dissolves in the pool of catalyst-solvent metal. There was no evidence that platinum formed a carbide more stable than diamond.

Figure 2:
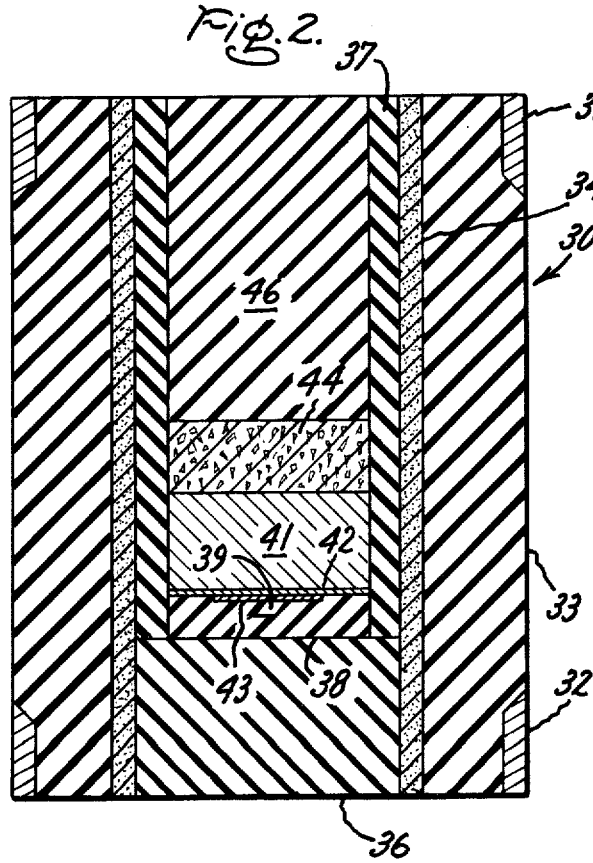
FIG. 2 illustrates in an enlarged view one reaction vessel construction assembled in accordance with this invention.

FIGS. 4–8 show alternate arrangements for the nucleation suppressing disc/barrier disc/diamond seed combination. In each case the balance of the reaction vessel construction not shown is the same as is represented in FIG. 2. The same numerals represent the same items of construction serving identical functions in the several views.

Figure 4:
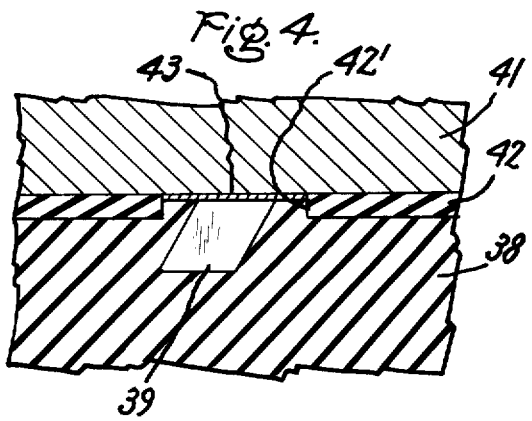
FIGS. 4, 5, 6, 7 and 8 are large scale views of the vicinity of the diamond seed material as this region would appear in three variations of the construction shown in FIG. 2
Figure 5:
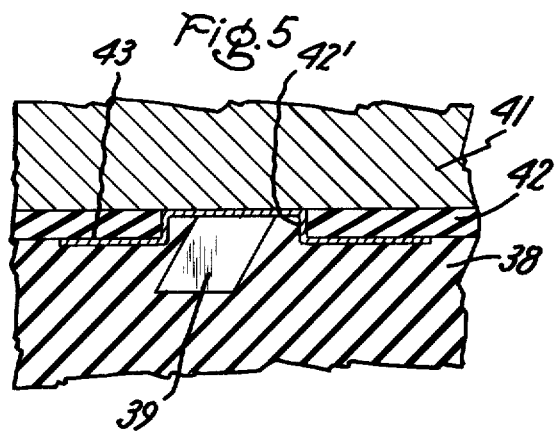
Figure 9:
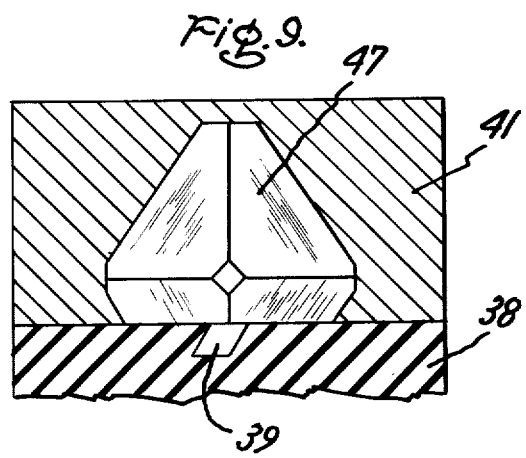
FIG. 9 shows the relation between new diamond growth, the diamond seed and the catalyst-solvent bath.

In each of FIGS. 4 and 5 a projecting portion of embedment disc 38 presents barrier layer 43 into contact with the underside of mass 41 of catalyst-solvent. Embedded seed 39 is disposed directly under disc 43 with a single face thereof in direct contact with disc 43. In FIG. 5, isolating layer 43 extends below the nucleation suppressing layer 42 beyond the edge of hole 42'. In FIG. 4 the material of which disc 38 is composed should separate seed 39 from the wall(s) of hole 42'. Thus, in the case of the arrangements of FIGS. 4 and 5, when nucleation suppressing disc 42 is non-metallic (and a cube face of seed 39 is offered as template for the new diamond growth), the relationship between the diamond seed and new growth 47 will be as shown in FIG. 9. It is advantageous not to have the new growth envelop the seed at all, because much less of the new growth will need to be polished away to remove flaws.

Figure 3:
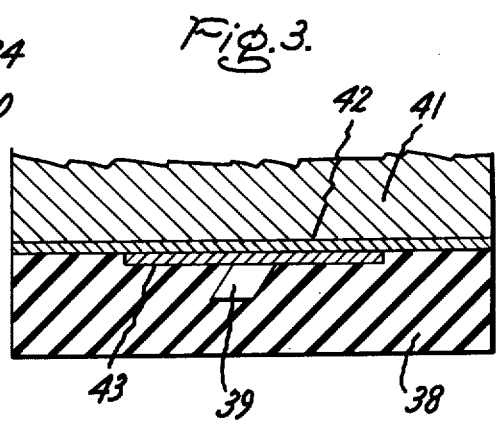
FIG. 3 is an even larger scale view of the vicinity of the diamond seed material shown in FIG. 2.
Figure 6:
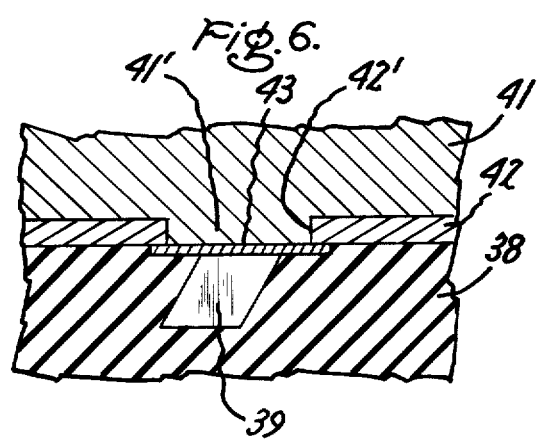

The arrangement shown in FIGS. 3 and 6 enable the production of new diamond growth as shown in FIG. 9, when nucleation suppressing layer 42 is metallic and thereby dissolved by the molten catalyst-solvent. As previously mentioned the growth configuration shown develops when a cube face of seed 39 is in contact with barrier layer 43. Projection 41' of the catalyst-solvent fits closely to the wall(s) of hole 42' and projects through hole 42' to contact barrier layer 43 over seed 39.

The advantage of using both the barrier layer and the nucleation suppressing layer may be assessed as follows. When only the barrier layer is employed about 70% of the attempts to grow single, large, high quality diamonds will encounter spontaneous diamond nucleation and interference with growth of the new diamond growth from the seed. Sometimes this interference is not serious, but most often the growth from the seed is badly damaged. When a nucleation suppressing layer is used the improvement is so dramatic that only about 30% of the attempts to grow single, large, high quality diamonds will encounter spontaneous diamond nucleation. In fact, since the use of natural mica has been instituted, spontaneous diamond nucleation has not occurred in a single instance.

Figure 7:
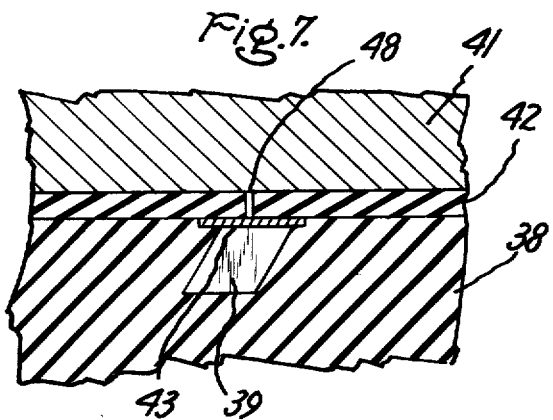
Figure 8:
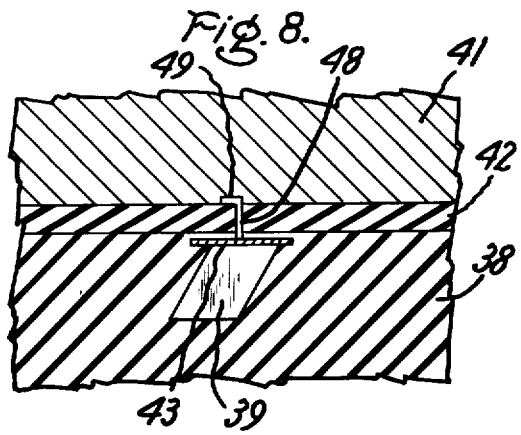

The arrangements of FIGS. 7 and 8 are useful, when solid non-metallic nucleation suppressing layer materials such as mica or machinable alumina are employed. In each case a small hole 48 is drilled or punched through disc 42. This hole is preferably in the range of from 0.001 to 0.020 inch in diameter. in the arrangement of FIG.7, when the catalyst-solvent material 41 becomes molten, it passes through hole 48 and, after a period of time, alloys with and melts isolation disc 43 thereby reaching diamond seed 39 to initiate diamond growth back up through hole 48 to provide seeding for diamond growth above layer 42. In the arrangement of FIG. 8 a wire 49 occupies hole 48. The wire may, for example, be of nickel, Fe—Al or Fe-Ni alloy and extends through disc 42 to contact both plug 41 and isolation barrier 43. As the catalyst-solvent material 41 and then the material of wire 39 become molten and carbon is dissolved therein, the isolating barrier 43 alloys and diamond growth begins for supplying a seed at the upper side of layer 42.

The temperature differential between the hot part of the cell (about half-way up the height of the cell) and the diamond pocket is preferably in the range of 20°–30° C. This differential depends upon the construction of the cell e.g. depth of mass of metallic catalyst-solvent, differential resistance in the heater tube, thermal conductivity of the end discs etc. Thus, the thickness of plug 41 helps determine the temperature differential prevailing in the reaction vessel. With a thicker mass of catalyst-solvent the temperature difference is greater. Vertical location of plug 41 is also determinative.

Gem quality diamonds have been produced in the practice of this invention in near colorless, clear light yellow and clear dark yellow. "Colorless" is used interchangeably with "white" or "water white". The near colorless crystals are typical truncated octahedra with modifying cube faces while the yellow stones are well developed octahedra with minor truncations and with one point diminished. The latter shape is excellent for high weight yield when cut as a round brilliant.

The near colorless stones rated H to J on the GIA Grading Scale, which has rating values ranging from D (colorless) to N (yellow). Occasional inclusions of catalyst-solvent occur in the crystals as removed from the apparatus, but many of these can be cut away in the preparation of a fashioned diamond.

Under 45× magnification these crystals may display minute white inclusions not visible under the 10×standard magnification used in the grading of diamonds. These minute inclusions do not affect the brilliance of the crystals and are not considered flaws.

The near colorless diamonds grown from a cube face phosphoresce after excitation by ultraviolet light (2537A) with a characteristic pattern in which a pair of non-phosphorescing linear bands in crossed relationship appear in contrast to the balance of the crystal, which phosphoresces. In contrast to those natural diamonds which phosphoresce these near colorless diamonds phosphoresce for a very long time, e.g. of the order of 1 hour. The phosphorescing diamonds are all low in nitrogen content.

Although all natural stones having a rating of G or lower (progressing toward N) on the GIA Color-Grading System have a large ultraviolet absorption band at about 4155 A, none of the near colorless H-J rating diamonds prepared according to this invention displayed such ultraviolet absorption band, i.e. these crystals give a substantially flat response from 2250 A to greater than 4500 A. This phenomenon makes such stones particularly useful as spectrometer crystals for the monitoring of radiation in the visible to ultraviolet range.

Further, the colorless diamonds in the H-J range (GIA scale) prepared according to this invention are good semi-conductors, when traces of boron are present. More boron (about ¼ ppm or more) starts to color crystal blue. The combination of crystal size (greater than 1/20 carat, particularly those greater than 1/5 carat), semiconductivity and near-colorless clarity afforded by these diamonds and not observed in natural diamonds provides an excellent capability for the construction of high pressure celles for the monitoring of absorption bands of materials subject to the simultaneous application of high pressure and applied voltage. Thus, such large, single-crystal near-colorless diamonds can be used as in-line windows for a high pressure cell for making observations during the conduct of high pressure processes.

Also, apparently because of (a) the difference in nitrogen content and (b) the manner in which the nitrogen is present, near colorless diamonds produced by the practice of this invention exhibit a much superior thermal conductivity at temperatures in the range of about 10°–100° K and abrasion resistance far in excess of that found in single crystal natural diamonds submitted to the grinding wheel abrasion test. Nitrogen contents of less than $10^{16}$ atoms of nitrogen per $cm^3$ (less than 20 ppm of N) in the diamonds of this invention are particularly effective in increasing both thermal conductivity and abrasion resistance.

Thus, the thermal conductivity of natural diamond did not exceed about 120 watts/cm° K (at 80° K) while near colorless diamond of this invention had a value of 180 watts/cm° K aT the same temperature.

In the grinding wheel abrasion test abrasion resistance quality (grinding ratio) is taken as the volume of corundum (removed from a 60 grit corundum wheel) in cubic inches removed per gram of diamond consumed. During the test the diamond is oriented with the most resistant grinding direction [the <110> direction on the cube face] against the wheel. During the test the in-feed to the corundum wheel was 0.001 inch for each pass. Near colorless diamond according to this invention (less than 20 ppm N content) displayed grinding ratios ranging from over 32,000 to 200,000 $in^3$/gm of diamond while colorless natural diamond gave grinding ratios ranging from 12,000–64,000 $in^3$/gm of diamond.

The near-colorless diamonds of this invention do not fluoresce under long wave ultraviolet light (3660 A) however, under short wave ultraviolet light (2537 A) these diamonds fluoresce strongly in tones of yellow and green.

Therefore, it can be concluded that the low nitrogen content, near colorless (H to J on the GIA Grading Scale) diamonds of this invention are superior to natural diamond for use as heat sinks at cryogenic temperatures and will provide more abrasion-resistant (and thereby more durable gem stones.

Preferred catalyst-solvents for the practice of this invention are Fe, FeNi, FeNiCo, Fe—Al, Ni—Al, Fe—Ni—Al and Fe—Ni—Co—Al. Preferred nucleation suppressants are natural mica and cobalt and the preferred isolation barrier is platinum. When natural mica is used it should first be fired as directed hereinabove. When alloys of higher iron content are used, the diamonds produced have a lighter yellow color. With larger amounts of Ni and/or CO the resulting diamonds have a deeper yellow color.

For the reaction vessel construction described the preferred pressures range from 55–57 kilobars (kb) and preferred temperatures are in the 1330°–1430° C. range.

In each of the following examples the reaction vessel configuration provided a temperature differential in the 20°–30° C range, the nutrient consisted of 1 part by weight Sp-1 (National Carbon Company) graphite and 3 parts weight 325 mesh diamond prepared by the thin film method, seeds used were ¼ to ½ mm and temperatures were measured using a Pt/Pt 10 Rh thermocouple:

EXAMPLE 1

[Run 102]

| | |
|---|---|
| Pressure | 57 kb |
| Temperature (13.2 mv.) | 1340–1360° C |
| Catalyst | 51Ni49Fe |
| Nutrient | 210 mgm |
| Nucleation Suppressing Layer | 5 mil Fe disc covering all of bottom of catalyst-solvent mass |
| Isolation Barrier | 5 mil Ta disc coextensive and contiguous with Fe disc |
| Seed Arrangement | 5 seeds in spaced relation in contact with Ta disc |
| Time | 22 hours 40 min |

Four yellow crystals were produced, one growing from each of four seeds. One seed produced a cluster. The new diamond growth varied in size from 10–20 mgm (1/20–1/10 carat). The crystals had small inclusions near one face but were otherwise clear. In each case the crystal habit was cubo-octahedral with modifying cube faces.

EXAMPLE 2

[Run 19]

| | |
|---|---|
| Pressure | 57 kb |
| Temperature (13.9 mv) | 1400–1420° C |
| Catalyst | 51Ni49Fe |
| Nutrient | 210 mgm |
| Nucleation Suppressing Layer | none |
| Isolation Barrier | 1 mil W disc covering all of bottom of mass of catalyst-solvent |
| Seed Arrangement | 5 seeds in spaced relation in contact with W disc |
| Time | 5 hours |

Five light yellow crystals resulted, one developed from each seed. The new growth had an average size of 1.52 mgm and each measured about 1 mm along a cube face. The crystals were well-formed, clear and relatively free of inclusions. In each case the crystal was cubo-octahedral with modifying cube faces.

With multiple seeding the requirement for nucleation suppression is reduced and with proper operating conditions and a seed population density of 1 seed/8–10 mm² the nucleation disc can be dispensed with.

EXAMPLE 3

[Run 70]

| | |
|---|---|
| Pressure | 56 kb |
| Temperature (13.4 mv) | 1360–1380° C |
| Catalyst | 51Ni49Fe |
| Nutrient | 450 mgm |
| Nucleation Suppressing Layer | 5 mil Co disc with 150 mil dia. hole |
| Isolation Barrier | 1 mil Pt disc as in FIG. 4 |
| Seed Arrangement | as in FIG. 4 |
| Time | 67 hours |
| Weight of Diamond Growth | 213 mgm |

The seeded diamond growth was yellow and of gem quality. Three other very small crystals grew out of the region occupied by the seeded growth. Crystal shape was truncated octahedron with modifying cube faces.

EXAMPLE 4

[Run 64]

| | |
|---|---|
| Pressure | 57 kb |
| Temperature (13.3–13.6 mv) | 1360–1400° C |
| Catalyst | 51Ni49Fe |
| Nutrient | 400 mgm |
| Nucleation Suppressing Layer | 5 mil Fe disc (FIG. 3) |
| Isolation Barrier | 5 mil Mo disc (FIG. 3) |
| Seed Arrangement | as in FIG. 3 |
| Time | 85 hours |
| Weight of Diamond Growth | 190.4 mgm |

A single beautiful yellow gem crystal developed. The crystal shape was cubo-octahedral.

EXAMPLE 5

[Run 58]

| | |
|---|---|
| Pressure | 56 kb |
| Temperature (13.7 mv) | 1390–1405° C |
| Catalyst | 51Ni49Fe |
| Nutrient | 400 mgm |
| Nucleation Suppressing Layer | 5 mil Co disc with 150 mil diameter hole |
| Isolation Barrier | 1 mil Pt disc in the 150 mil diameter hole |
| Seed Arrangement | as in FIG. 4 |
| Time | 68¾ hours |
| Weight of Diamond Growth | 156 mgm |

A single beautiful golden yellow gem was produced in a cubo-octahedron shape with modified octahedral edges.

EXAMPLE 6

[Run 42]

| | |
|---|---|
| Pressure | 56.5 kb |
| Temperature (13.2 mv) | 1345–1360° C |
| Catalyst | Fe + 3 wt.% Al |
| Nutrient | 500 mgm |
| Nucleation Suppressing Layer | None |
| Isolation Barrier | 1 × 20 × 20 mils Pt disc |
| Seed Arrangement | as in FIG. 4 |
| Time | 160 hours |
| Weight of Diamond Growth | 206 mgm |

A single beautiful, near colorless crystal was grown. Crystal shape was truncated cubo-octahedron with modifying cube faces; phosphoresces over 1 hour after exposures to 2537 A light; gives high, substantially flat transmission of ultraviolet light from about 2250 A–3.30 $\mu$ and from 6.00 $\mu$ to 50 $\mu$; is semi-conducting and thermoluninesces. The thermal conductivity of the crystal at 80° K was at least 180 watts/cm° K.

EXAMPLE 7

[Run 50]

| | |
|---|---|
| Pressure | as in Example 6 |
| Temperature (13.2 mv) | as in Example 6 |
| Catalyst | as in Example 6 |
| Nutrient | as in Example 6 |
| Nucleation Suppressing Layer | none |
| Isolation Barrier | 1 × 20 × 20 mils Pt disc |
| Seed Arrangement | as in FIG. 4 |
| Time | 161 hours |
| Weight of Diamond Growth | 256 mgm |

In addition to the seeded growth one other small (22 mgm) diamond crystal grew and interferred slightly with seeded growth, which was colorless and gem quality. The flaws were polished out to produce a 194 mgm crystal. The crystal possessed properties of phosphorescence, ultraviolet transmission, electrical conductivity, thermal conductivity and thermoluminescence as in Example 6. Abrasion resistance was very high. Since very small amounts of diamond are removed in making the grinding wheel abrasion test, measurements are difficult to make accurately when large amounts of corundum are removed. Test results produced grinding ratios ranging from 120,000 to 168,000 in$^3$/gm of diamond seed.

EXAMPLE 8

| [Run 198] | |
|---|---|
| Pressure | 55 kb |
| Temperature | 1300° C |
| Catalyst | 95Fe5Al (prealloyed) |
| Nutrient | 500 mgm |
| Nucleation Suppressing Layer | 2 mil natural mica (fired) disc with 7 mil diameter hole |
| Isolation Barrier | 1 × 20 × 20 mils Pt disc |
| Seed Arrangement | as in FIG. 7 |
| Time | 190 hours |
| Weight of Diamond Growth | 140 mgm |

A single, nearly-flawless crystal was formed. The crystal was in the shape of a truncated octahedron. In addition to the (111) faces, the crystal had cube faces (100), dodecahedron faces (110) and (113) faces.

Experiments have verified the lack of utility of synthetic mica, platinum, nickel and molybdenum as nucleation suppressing materials.

After termination of each run and reduction of temperature and pressure to permit removal of the reaction vessel 30, the new diamond growth embedded in the solidified metallic catalyst-solvent 41 readily detaches from the seeding site(s). The diamond(s) so prepared is easily removed by breaking open the mass 41. Designations of the diamond seed are schematic and no attempt has been made to show the preferred disposition.

The crystals resulting from the practice of this invention develop in symmetries determined by the face of the seed crystal selected as the pattern. Thus, a diamond crystal grown from a cube face (100) of the seed crystal will be symmetrical about the cube axis and, in the case of near colorless diamonds, such a crystal will result in the unique pattern of phosphorescence described hereinabove. Although crystals symmetrical about other axes can be formed using other faces of the seed crystal [e.g. (110), (111), (113)] to set the growth pattern, diamonds symmetrical about the cube axis yield the most crystal and are of the best quality for a given reaction cell volume during a given growth time. It is an important feature of this invention that the seed crystal sets the growth pattern for, but does not become part of, the new diamond growth pattern thereby assuring symmetrical growth without having the interior obscured as by the presence of a seed.

What we claim as new and desire to secure by Letters Patent of the United States is:

1. In a diamond synthesis reaction vessel for introduction into the reaction volume of a high pressure, high temperature apparatus, said reaction vessel constituting an assembly of interfitting elements for enclosing diamond seed material and a source of substantially pure carbon, said diamond seed material and source of carbon being separated by a mass of metallic catalyst-solvent material for the diamond-making reaction disposed therebetween so as to provide a predetermined temperature gradient between said diamond seed material and said source of carbon under operating conditions of pressure and temperature in the diamond stable region of the phase diagram of carbon, said diamond seed material and said source of carbon being located in separate regions of said reaction vessel such that under said operating conditions said diamond seed material will be heated to a temperature near the minimum value of temperature for said temperature gradient and simultaneously said source of carbon will be heated to a temperature near the maximum value of temperature for said temperature gradient, the combination with said interfitting elements of
   a. metallic means for isolating said diamond seed material from contact with said catalyst- solvent material for a preselected period of time under operating conditions of pressure and temperature,
   b. means for suppressing diamond nucleation,
   c. said isolating means and said nucleation suppressing means being in separate layers; said isolating means, said nucleation suppressing means and said mass of catalyst-solvent material being of different materials in any given reaction vessel construction, said isolating means being made of a material having a melting point, when in contact with diamond, that is higher than the melting point of said catalyst-solvent material saturated with carbon dissolved therein, when in contact with diamond,
   d. said isolating layer being in contact with said diamond seed material and being disposed between the said diamond seed material and said mass of catalyst-solvent material and
   e. said nucleation suppressing layer being disposed in contact with the underside of said mass of catalyst-solvent material.

2. The combination recited in claim 1 wherein the isolating means is a layer of a material selected from the group consisting of platinum, molybdenum, titanium, tantalum, tungsten, iridium, osmium, rhodium, palladium, vanadium, ruthenium, chromium, hafnium, rhenium, niobium and zirconium and alloys thereof.

3. The combination recited in claim 2 wherein the nucleation suppressing means is a layer of a material selected from the group consisting of cobalt, iron, manganese, titanium, chromium, tungsten, vanadium, niobium, tantalum, zirconium, alloys of the preceding metals, natural mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family.

4. The combination recited in claim 1 wherein the diamond seed material is a single crystal.

5. The combination recited in claim 4 wherein the diamond seed is oriented with a cube face thereof in contact with the isolating layer.

6. The combination recited in claim 1 wherein the nucleation suppressing layer is co-extensive with the underside of the mass of a catalyst-solvent material.

7. The combination recited in claim 1 wherein the diamond seed material and the isolating layer are located in a hole in the nucleation suppressing layer.

8. The combination recited in claim 7 wherein the isolating layer also extend below the nucleation suppressing layer beyond the edge of the hole.

9. The combination recited in claim 1 wherein a portion of the mass of catalyst-solvent material protrudes through a hole in the nucleation suppressing layer into contact with the isolating layer.

10. In a process for producing diamond material of gem quality and size wherein a reaction vessel containing (a) diamond seed material and (b) a source of carbon separated by (c) a mass of catalyst-solvent material for the diamond-making process is subjected to simultaneous pressurizing and heating at a pressure and temperature in the diamond stable region of the phase diagram for carbon; said source of carbon, said catalyst-solvent material and said diamond seed material being disposed in said vessel so that during said pressurizing and heating a predetermined temperature gradient exists between said diamond seed material and said source of carbon such that said diamond seed material is at the minimum value of temperature for said temperature gradient while said source of carbon is at the maximum value of temperature gradient, the improvement of inhibiting diamond growth in the following locations for the time described 1) over surface area of said diamond seed material adjacent said catalyst-solvent material until said mass of catalyst-solvent material has become saturated with carbon and 2) in the peripheral vicinity of said diamond seed material while diamond growth is developing from said diamond seed material, a layer of an isolation material being used over surface area of said diamond seed material for inhibiting at location 1) above and a layer of nucleation suppressing material placed in contact with the underside of the mass of catalyst-solvent material for inhibiting at location 2) above said isolation material and nucleation material differing from each other and from the catalyst-solvent employed.

11. The improved process of claim 10 wherein the isolating material is selected from the group consisting of platinum, molybdenum, titanium, tantalum, tungsten, iridium, osmium, rhodium, palladium, vanadium, ruthenium, chromium, hafnium, rhenium, niobium, and zirconium and alloys thereof, in any given reaction vessel said isolating material having a melting point, when in contact with diamond, that is higher than the melting point of the catalyst-solvent material saturated with carbon dissolved therein when in contact with diamond.

12. The improved process of claim 10 wherein in conducting the process the isolating material, the nucleation suppressing material and the catalyst-solvent material are different materials; said isolating material having a melting point, when in contact with diamond, that is higher than the melting point of said catalyst-solvent material saturated with carbon dissolved therein, when in contact with diamond; said isolating material being selected from the group consisting of platinum, molybdenum, titanium, tantalum, tungsten, iridium, osmium, rhodium, palladium, vanadium, ruthenium, chromium, hafnium, rhenium, niobium and zirconium and alloys thereof and said nucleation suppressing material being selected from the group consisting of cobalt, iron, manganese, titanium, chromium, tungsten, vanadium, niobium, tantalum, zirconium, alloys of the preceding metals, natural mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family.

13. The improved process of claim 10 wherein said seed material is a single crystal.

14. The improved process of claim 10 wherein said seed material includes a plurality of crystals.

15. The improved process of claim 10 wherein said seed material, carbon source and catalyst solvent are positioned in stacked planar relationship within said reactor vessel.

16. The improved process of claim 15 wherein said nucleation suppressing layer is formed of a material with which the molten catalyst-solvent will not alloy or penetrate at said operating conditions and has at least one opening in said layer between said diamond seed material and said mass of catalyst-solvent at said operating conditions.

17. The improved process of claim 10 wherein the catalyst-solvent material includes at least one projection extending through an opening in said nucleation suppressing barrier layer.

18. The improved process of claim 17 wherein said nucleation barrier is a metal, and said opening in the nucleation barrier is circular and the ratio of the lateral dimension of the opening to the largest dimension of the seed material is in the range of 1.5:1 to 5:1.

19. The improved process of claim 16 wherein said nucleation barrier is a solid non-metallic material, and at least one said opening is adapted and arranged to comprise a restricted diamond growth path less than 0.02 inches in diameter extending through said barrier and interconnecting said mass of said catalyst-solvent material and a volume containing said diamond seed material.

20. The improved process of claim 19 wherein disposed in said opening is a solid wire of a catalyst-solvent material for the diamond making reaction.

21. The improved process of claim 15 wherein said isolation barrier layer has a melting point when in contact with diamond which is higher than the melting point of said mass of catalyst-solvent when said mass is saturated with dissolved carbon.

22. The improved process of claim 14 wherein said nucleation suppression layer extends from said seed material a distance of at least 50% greater than the lateral growth dimension of the diamond to be grown.

23. The improved process of claim 22 wherein said nucleation suppression layer extends over said seed material.

* * * * *